United States Patent [19]

Harper et al.

[11] 4,102,562
[45] Jul. 25, 1978

[54] RETROREFLECTIVE TRANSFER SHEET MATERIAL

[75] Inventors: James H. Harper, North Saint Paul; Linda S. Smith, Saint Paul, both of Minn.

[73] Assignee: Minnesota Mining and Manufacturing Company, Saint Paul, Minn.

[21] Appl. No.: 695,974

[22] Filed: Jun. 14, 1976

[51] Int. Cl.² ............................................. G02B 5/128
[52] U.S. Cl. .................................... 350/105; 350/97; 350/103; 428/323
[58] Field of Search ................. 428/913; 350/105, 97, 350/98, 99, 299; 2/115, 156

[56] References Cited

U.S. PATENT DOCUMENTS

| | | | |
|---|---|---|---|
| 2,403,752 | 7/1946 | Phillippi | 350/105 |
| 2,646,364 | 7/1953 | Porth | 350/105 |
| 3,535,019 | 10/1970 | Longlet | 350/105 |
| 3,649,352 | 3/1972 | Rourneya | 350/105 |
| 3,758,192 | 9/1973 | Bingham | 350/105 |
| 3,801,183 | 4/1974 | Sevelin et al. | 350/105 |

OTHER PUBLICATIONS

Condensed Chemical Dictionary–8th Edition, 1971, Van Nostrand Publishing Co., N.Y.C., N.Y.

Primary Examiner—John K. Corbin
Assistant Examiner—B. W. delos Reyes
Attorney, Agent, or Firm—Cruzan Alexander; Donald M. Sell; Roger R. Tamte

[57] ABSTRACT

Retroreflective images are formed on garments and other substrates with a transfer sheet material that comprises a support sheet, a dense continuous monolayer of transparent microspheres partially embedded in the support sheet, and a thick transfer layer printed over a limited portion of the continuous layer of microspheres in an imagewise pattern. In use the transfer sheet material is laid against a substrate, the transfer layer adhered to the substrate, and the support sheet stripped away. The transfer layer remains in place and pulls the microspheres from the support sheet, leaving a sharply defined design that is retroreflective over the full area of the design.

12 Claims, 4 Drawing Figures

RETROREFLECTIVE TRANSFER SHEET MATERIAL

BACKGROUND OF THE INVENTION

During the growth in popularity of decorative emblems on garments such as T-shirts or jackets, there has been a continuing desire for ways to make such emblems retroreflective. On an outer garment worn at night, such retroreflective emblems would provide a bright return of light to oncoming motorists, thereby adding a safety feature, as well as increased decorative appeal, to the garments.

Insofar as known, no one has previously found a practical or commercially useful way to provide such retroreflective emblems. Some have proposed silk-screening a design onto a garment, and then while the design is still wet, cascading microspheres onto the design; but such an approach is messy, usually provides nonuniform deposit of microspheres, and is impractical for obtaining high reflective brightness (which requires that the embedded surfaces of the microspheres be covered with a specularly reflective layer). Others have proposed mixing hemispherically specularly-coated glass microspheres into ink and printing such an ink onto the garment (see Longlet et al, U.S. Pat. No. 3,535,019); but while such a product is useful for some purposes, it provides a reduced reflectance because the hemispherically-coated microspheres are randomly oriented within an applied coating. Still others long ago proposed the preparation of retroreflective decals comprising a layer of glass microspheres disposed over a printed design (see Phillippi, U.S. Pat. No. 2,422,256); but the suggested decal was a several-layer product almost certainly stiff and unsuited for conformable garments; and the reflective area of the decal was not coextensive with the design areas, with the result that formation of a reflective emblem required a separate cutting operation in registration with the design incorporated in the decal.

The only commercial products suitable for reflective emblems or markings on garments have generally been single-colored tapes or sheet materials, with constructions as described in Palmquist et al, U.S. Pat. No. 2,567,233; Bingham et al., U.S. Pat. No. 3,551,025; Bingham, U.S. Pat. No. 3,700,305; and Bingham, U.S. Pat. No. 3,758,192. But none of these commercial products is useful to form the complex multi-colored designs that are in fashion and are needed to maximize use of retroreflective emblems.

The result is that, in spite of the described efforts, multi-colored designs or emblems on garments continue to be non-retroreflective and the potential use of such emblems for safety purposes goes unrealized.

SUMMARY OF THE INVENTION

The present invention provides a novel transfer sheet material useful for forming retroreflective graphic images on a substrate, including fabrics as well as other substrates. This new transfer sheet material comprises, briefly, a support sheet that includes a dimensionally stable base sheet and a heat-softenable exterior layer carried on said base sheet; a dense continuous monolayer of transparent microspheres partially and removably embedded in the heat-softenable layer to a depth averaging between about one-quarter and one-half of their diameters and partially exposed above the support sheet; a specularly reflective layer covering the exposed surfaces of the microspheres; and a thick transfer layer printed over a limited portion of the continuous layer of microspheres in an imagewise pattern, the parts of the microspheres exposed above the support sheet being embedded in the patterned layer, and the transfer layer being adhereable to a substrate while retaining its imagewise pattern.

This new transfer sheet material is used by laying it on a substrate, with the transfer layer against the substrate; adhering the transfer layer to the substrate; and then stripping the support sheet away. Thereupon the continuous layer of microspheres is divided: the microspheres embedded in the adhered patterned layer are pulled out of the support sheet that previously held them, and the remaining microspheres are carried away with the support sheet. An emblem, comprised of the transfer layer and a layer of microspheres partially embedded in the transfer layer and partially exposed above the transfer layer, is left in place on the substrate.

Despite the beaded nature of the described microsphere-covered support sheet, transfer inks such as vinyl plastisol inks can be printed into the support sheet in the needed thickness with good definition of design. Further, when the transfer layer is transferred, generally through use of heat and pressure, it transfers with sharp definition. The result is that retroreflective emblems having the same order of definition of design obtained in non-reflective heat-transferred emblems may be obtained. Multi-colored, intricately patterned designs may be formed, and the designs may be formed in separated parts, adhered to the garment in isolation from other parts with no connecting web or marginal adhesive area between the parts. Designs may be formed with the same fine detail and separation as characterizes embroidered stitchery.

Yet the designs are retroreflective in each and every part, up to the exact edges of the design areas. There is no misalignment of design and retroreflective areas, since the microspheres transfer out of the support sheet, providing retroreflection in exact registration with the design.

Another advantage of transfer sheet materials of the invention is that they are thin, with few layers, so that garments reflectorized with them are of essentially the same conformability or drapability as garments with non-reflective emblems. Also, transfer is obtained by the same general procedures and equipment as already used in the fabric industry.

Support sheets as described above, in which microspheres are temporarily supported and then removed after some subsequent operation, are well known in the art. Generally the support sheets have been used as a temporary support while a specularly reflective coating was applied to the microspheres or as a carrier while a reflective sheeting was built by a series of coating operations over the microspheres; see McKenzie, U.S. Pat. No. 3,190,178; and Sevelin et al., U.S. Pat. No. 3,801,183. However, insofar as known, such support sheets have never been used in the manner described above, in which a transfer ink is first printed onto the partially embedded, partially protruding microspheres in an imagewise pattern that extends over only a portion of the layer of microspheres; the transfer ink is then adhered to a substrate; and the support sheet stripped away, whereupon the layer of microspheres is divided, with the transfer layer pulling the microspheres out of the support sheet so as to provide the described fully reflectorized isolated images.

All in all, the invention provides emblems having all the previous features of emblems on garments, but with the added feature of retroreflectivity, which was never previously obtained in such emblems. And the invention provides such emblems simply and at little added cost.

While the invention is particularly adapted to retroreflectorization of fabrics, and is discussed herein particularly in that context, the invention is also useful to retroreflectorize other substrates, including smooth-surface sheets or articles. In general, the invention is most useful when it is desired to provide isolated images on a substrate reflectorized in exact registration with the images.

DETAILED DESCRIPTION

Figure 1:
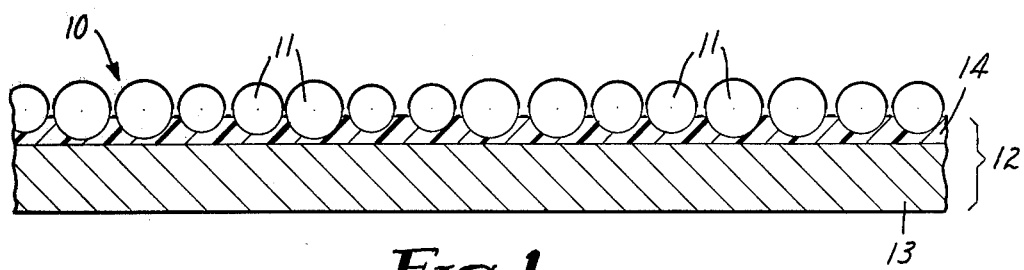
FIGS. 1 and 2 are enlarged sectional views through portions of sheet material of the invention at different stages of manufacture.

The invention will first be illustrated by reference to representative examples for preparing and using sheet materials of the invention. The examples will be discussed with reference to the illustrative showings in the drawings, beginning with FIG. 1.

EXAMPLE 1

Sheet material 10 as shown in FIG. 1 was prepared by cascading transparent glass microspheres 11 of about 1.92 refractive index and ranging in diameter from about 70 to 100 micrometers onto a support sheet 12 consisting of Kraft paper base sheet 13 covered with a heat-softenable layer 14 of low-density polyethylene; thermally sinking the microspheres 11 to about 30 percent of their diameters by passing the support sheet 12 through a tunnel oven; and coating the exposed surfaces of the microspheres with a transparent dielectric mirror (shown in the drawings by a heavy line). Such a mirror, which is both transparent and specularly reflective, was prepared (as generally described in Bingham, U.S. Pat. No. 3,700,305) by first vapor-coating a layer of cryolite ($Na_3AlF_6$) in an optical thickness (the product of physical thickness and index of refraction) corresponding to about one-quarter wavelength of white light (i.e. about one-quarter of 5500 angstroms, which is in the middle of the wavelength spectrum of visible light), and by then vapor-coating a one-quarter-wavelength-thick layer of zinc sulfide over the layer of cryolite.

A priming layer (not illustrated) was next applied over the dielectric mirror by coating a solution of the following ingredients using a two-roll coater, with a notched bar metering off excess, and with the gap between the bar and web adjusted to deposit about 18 grains per 4-inch-by-6-inch area (7 milligrams per square centimeter) of the support sheet.

| Ingredients | Parts by Weight |
| --- | --- |
| High-molecular-weight polyurethane resin ("Estane" 5713 from B. F. Goodrich Chemical Company) | 14 |
| Cyclohexanone | 39.7 |
| Methylethylketone | 26 |
| Dimethylformamide | 4.3 |
| Carbitol acetate | 16 |

| -continued | |
| --- | --- |
| Ingredients | Parts by Weight |
| Adhesion-promoting silane having reactivity toward polyurethane ("Chemlock" AP-134 from Hughson Chemicals, Lord Corporation, Erie Pa.) | 2.0 |

The coating was dried three minutes at 250° F (120° C) to give a dry coating weight of between 2 and 3 grains per 4-inch-by-6-inch (0.8 to 1.2 milligrams per square centimeter) area.

A backsize comprising a layer (not illustrated) weighing 2.0 to 2.5 grains per 4-inch-by-6-inch area (0.8 to 1 milligram per square centimeter) of cellulose acetate was then coated from solution onto the non-microsphere-covered surface of the carrier sheet to provide ease of handling and curl resistance.

Figure 2:
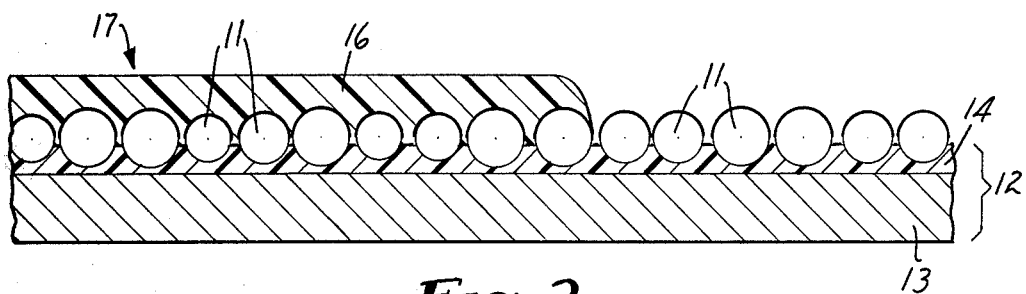

A multi-colored transfer layer 16 (see FIG. 2) was next silk-screen-printed in an imagewise pattern onto the primed microsphere-covered surface of the support sheet. The layer was printed in a reverse image so that a positive image would be formed when the material was transferred to fabric. Samples were prepared using several different commercial pigmented vinyl plastisol inks, including "Colonial Stretch Ink" from Colonial Printing Ink Company, East Rutherford, New Jersey; "Naz-Dar PS Series Plastisol Ink" from the Naz-Dar Company, Chicago, Ill.; and "Advance Deco-Flex Plastisol Ink" from Advance Process Supply Company, Chicago, Ill., all of which comprise vinyl particles uniformly dispersed in a plasticizer such as an orthophthalate ester. These inks were screened and fused using the conditions specified by the ink manufacturers, which typically involved the use of a 6xx or 8xx screen and alternative heating cycles of about 10 minutes at a temperature of 200° F (94° C), or 1½ to 2 minutes at a temperature of 250° F (120° C), or 20 to 30 seconds at a temperature of 300° F (150° C). The dry transfer layer of ink 16 varied in thickness generally from about 40 to 75 micrometers, depending on the number of sublayers in a particular area of the layer 16. Sheet material 17 as shown in FIG. 2 resulted.

Figure 3:
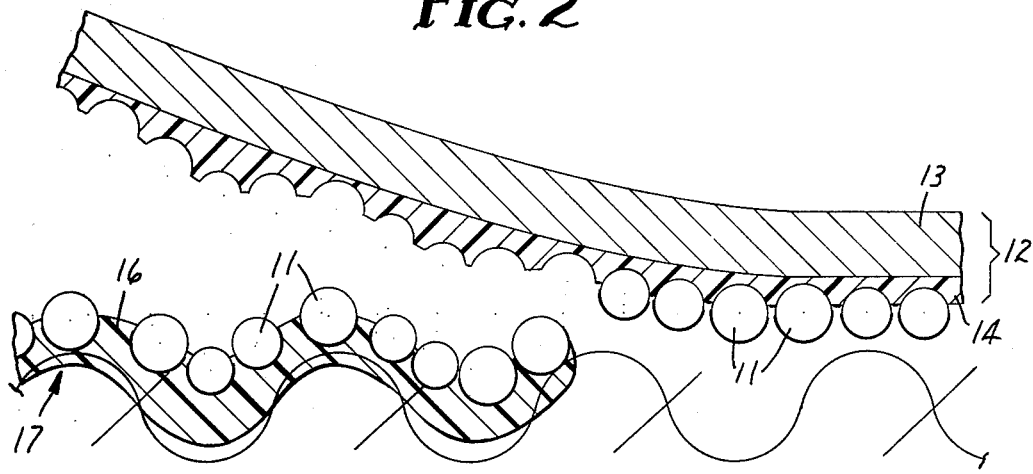
FIG. 3 illustrates application of a sheet material of the invention to a fabric.

The different samples of sheet material were then used to apply emblems on a variety of fabrics, including cottons, and cotton-polyester blends. The completed sheeting as illustrated in FIG. 2 was laid against the fabric, transfer- or patterned-layer side down, and the assembly was placed in a heat-transfer machine set at 350° F to 400° F (175° C to 200° C), where pressure was applied for 30 seconds at the lower temperature or 10 seconds at the higher temperature. During this time the ink softened and penetrated into the fabric. After allowing the assembly to cool, the support sheet 12 was peeled back and removed, whereupon the layer of microspheres was divided as shown in FIG. 3. In the areas occupied by the transfer layer 16, the microspheres separated from the support sheet and remained adhered in the transfer layer; in areas where no transfer layer was present, the microspheres remained in the support sheet and were pulled away with the support sheet. The microspheres remaining on the fabric were partially exposed with their uncovered surface facing outwardly and their embedded surface covered with a dielectric mirror. Since the dielectric mirror was transparent, the design was visible underneath the layer of glass microspheres.

The daytime appearance of the resulting fabrics and transferred emblems was similar to that obtained with heat transfers that carry no layer of microspheres, except that the emblems had a somewhat matte finish and were slightly more frosty because of the presence of the microspheres. The transfer of ink and of microspheres was well defined and essentially as sharp as that of a conventional vinyl ink transfer on garments.

As illustrated in FIG. 3, after a transfer operation to fabric has been completed, the transfer layer and the heat-softenable layer of the support sheet may have deformed in conformity with the texture of the fabric. When such deformation occurs, the microspheres tend to move slightly into valleys of the fabric, and become somewhat spread apart at the peaks of the fabric. Although such movements occur, the microspheres continue to be removable from the support sheet and remain partially embedded and optically exposed in the uncovered transfer layer. This desired positioning of the microspheres is believed to be assisted by the dimensional stability of the base sheet of the support sheet, i.e. the base sheet, which is typically a Kraft paper, retains its original dimensions during use of it, including the transfer operation.

Figure 4:
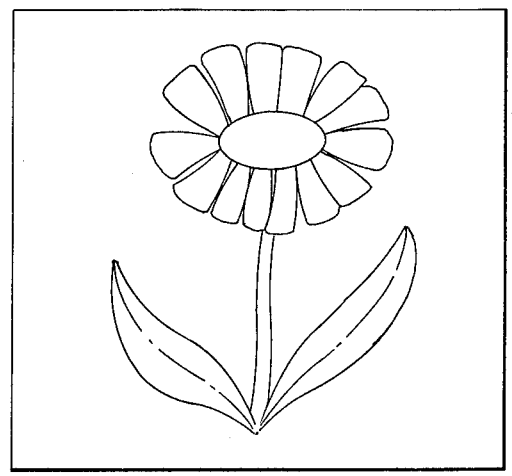
FIG. 4 is a plan view of an illustrative emblem transferred according to the invention.

A representative transferred design is illustrated in FIG. 4. As seen the whole transferred material is design (in contrast to conventional decals; there is no connecting material between the leaves and flowers, for example). Yet the whole of the design is retroreflective, with microspheres covering all of the transferred design. When the fabrics were illuminated in a dark room, the transferred emblems reflected with from 50 to 225 candle power/foot candle/square foot when viewed at −4° incidence at a 0.2° divergence angle.

Sample garments were washed in a "Maytag" automatic washer using hot water and "Tide" detergent, and the average loss in retroreflective intensity in percent was as tabulated below:

| Number of Washes | Loss in Retroreflective Intensity (percent) |
| --- | --- |
| 5 | 60 |
| 15 | 70 |
| 25 | 75 |
| 40 | 80 |
| 50 | 84 |

The following example illustrates the use of a different kind of adhesion-promoting agent, and of an ink that includes a reactive ingredient for reaction with the adhesion-promoting agent to increase the strength of the bond between the ink and the glass microspheres.

EXAMPLE 2

A sheet material as shown in FIG. 1 was prepared in the manner described in Example 1. Next an adhesion-promoting layer was applied over the vapor-coated microspheres using an air-knife coater and a coating solution that comprised 2 weight-percent of gamma-glycidoxypropyltrimethoxysilane (Dow Z6040 from Dow-Corning Corporation; alternatively A-187 from Union Carbide Corporation could be used). The balance of the solution was water adjusted with acetic acid to have a pH of between 3 and 5. The solution was applied very thin and dried for 2 minutes at 150° F (65° C), leaving an approximately monomolecular layer of silane on the vapor-coated surface of the microspheres.

A multi-colored transfer layer was silk-screened onto the silane layer using a 6xx screen and ink that comprised vinyl particles dispersed in an orthophthalate ester plasticizer, pigment, and a melamine believed to be an etherified methylolmelamine such as hexa(methoxymethyl) melamine ("Stretch-Lon" Series 7500 Ink and Flock adhesive from Colonial Ink Company). The ink was then heated to 250° F (120° C) for about 30 seconds. During fusing of the ink it is believed that the melamine component reacts with the epoxide moiety of the silane molecule, providing a chemical linkage between the ink and silane coating. In addition, the silane molecules are believed to hydrolyze to silanol groups and react with SiOH groups on the surface of the glass. The silane thus serves as a coupling agent, forming a chemical linkage between the ink and glass beads.

The resulting retroreflective sheet material was transferred using a heat-transfer machine set at a temperature of 375° F (190° C) with heat and pressure applied for 15 seconds. After the assembly had cooled and the support sheet been removed, the fabric was again placed in the heat-transfer machine, and heat and pressure were applied directly to the surface of the microspheres for 15 seconds. This second application of heat and pressure forced the ink to penetrate the fabric for maximum adhesion. Such a transfer procedure is especially useful with regular nylon and some waterproof nylon fabrics, which are otherwise especially difficult to adhere to. It may also be used with cotton, cotton-polyester, and other synthetic blends.

Although a priming layer as described in Example 1 is not essential, such a priming layer generally improves the washing durability of a garment carrying an emblem of the invention. Further, the use of a prime layer expands the kind of printing or coating operations that can be used to prepare sheet material of the invention. The ink of conventional heat-transfer sheet materials is typically coated or printed through silk-screening techniques, and such techniques are especially desirable to print onto a beaded layer. However, when a prime layer has been used, flexographic printing techniques are facilitated, permitting more rapid and less-expensive preparation of sheet materials. The prime layer apparently fills in some of the interstices between microspheres so as to provide a more even surface which receives the ink of a flexographic printing roll.

Polyurethane primers are especially desirable because they maintain good adhesion to glass beads even when exposed to the hot water of a washing operation, they have good adhesion to vinyl plastisol inks, and they strip easily and smoothly from polyolefins, which are preferably used as the heat-softenable layer in support sheets of the invention. Instead of polyurethane primers, polyesters and acrylics can be used.

Vinyl plastisol inks are especially useful in transfer sheet materials of the invention. Such inks are widely available and the art of using them is well developed. Further, plastisols are particularly desirable for application of thick layers: they can be printed in solvent-free from and thus all of the printed material remains to form the final transfer layer. Even when printed in such thick layers, vinyl plastisol inks exhibit the needed adhesive but image-retaining condition during a transfer operation; that is, they soften so as to adhere to a substrate or penetrate into a fabric, but they do not smear or flow out of the image shape. Transfer layers that retain an imagewise pattern throughout a transfer operation can also be provided in other ways, as by including in the transfer layer a material that is adhesive without use of heat, e.g. a pressure-sensitive adhesive, in which case sheet material of the invention will generally include a release liner covering the adhesive surface of the transfer layer.

The transfer layer must be thick enough so that there is adequate support for the glass microspheres; and when used on fabrics, sufficient ink material to penetrate and attach the transfer to the fabric. To obtain good adhesion to fabric, the transfer layer should have a thickness of at least 25 micrometers and preferably at least about 40 micrometers. Generally the transfer layer will be less than 150 micrometers, and preferably less than 100 micrometers, in thickness. Thicknesses of about the same order of those for non-reflective ink transfers can be used.

As indicated above, the transfer layer will often comprise more than one sublayer, e.g. a different sublayer for each color of a printed design. The needed thickness of the transfer layer may be obtained solely with image-defining inks, or alternatively, image-defining inks may be printed in thin layers, and then a backing layer, for example, a white background layer, may be printed over the design layers. When the latter technique is used, the image-defining inks may be applied by flexography or lithography, and the backing layer printed by a silk-screen process. The inks applied are typically pigmented, but they may also be clear; and the whole transfer layer may be formed from one single-colored ink.

The transparent microspheres used in sheet materials of the invention are typically glass and have diameters between about 25 and 150 micrometers, preferably between about 50 and 100 micrometers. For best reflective properties, their index of refraction should be about 1.92.

Transparent dielectric mirrors are generally preferred as the specularly reflective layer on the microspheres in sheet materials of the invention, since they allow the color of the inks to be visible through the dielectric mirror, and therefore are adapted to much greater variety in design. In general, such dielectric mirrors, as taught in Bingham, U.S. Pat. No. 3,700,305, comprise at least one thin transparent layer having an optical thickness corresponding to an odd-numbered multiple of about one-quarter wavelength of light in the wavelength range of about 3800 and about 10,000 angstroms. The transparent layer has a refractive index $n_1$, and the faces of the layer are in contact with materials of refractive index $n_2$ and $n_3$, which should both be at least 0.1 (and preferably 0.3) either higher or lower than $n_1$. Preferably transfer sheet materials of the invention include two or more contiguous transparent layers to obtain higher reflectivity, each layer being in contact with material having a refractive index that is at least 0.1 (and preferably 0.3) either higher or lower than the refractive index of the layer. Useful materials for providing the transparent layers, generally by vapor-deposition, include high-refractive-index materials such as zinc sulfide, zinc selenide, and bismuth oxide, and low-index-materials such as cryolite, magnesium fluoride and silicon dioxide.

While tranparent under ordinary diffused lighting conditions, the dielectric mirror also reflects a large enough percentage of light by phase agreement or enhancement of reflection from the interfaces of the transparent layer or layers to provide bright retroreflection of light beamed at the mirror, as when an emblem formed according to the invention is illuminated by an oncoming motorist at night. Where transparency is not needed, the specularly reflective layer may comprise vapor-coated metal such as aluminum.

The best material for the heat-softenable layer of the support sheet is generally polyolefins, particularly polyethylene. These materials soften at desired temperatures, provide a normally firm and nontacky support from which the microspheres can be removed, and are compatible with inks and other materials to be coated onto the support sheet. The microspheres should be embedded into the support sheet to a depth of between about one-quarter and one-half of their diameters, and preferably about one-third of their diameters, to allow the most clean removal of the microspheres from the support sheet after the patterned layer has been adhered to the fabric.

What is claimed is:

1. Transfer sheet material for forming retroreflective graphic images on a substrate, said sheet material comprising a support sheet; a dense continuous monolayer of transparent microspheres partially and removably embedded in the support sheet to a depth averaging between about one-quarter and one-half of their diameters; a specularly reflective layer covering the surfaces of the microspheres that are exposed above the support sheet; and a transfer layer printed over the layer of microspheres in an imagewise pattern which leaves areas of the layer of microspheres unprinted; the transfer layer being of a thickness such as to embed within it the surfaces of the microspheres that are exposed above the support sheet in the printed areas, and the transfer layer being adhereable to a substrate while retaining its imagewise pattern; whereupon when the transfer layer is adhered to said substrate and the support sheet stripped away, the transfer layer is left in place on the substrate with the microspheres pulled from the support sheet and partially embedded in the transfer layer to form an image that is retroreflective over its full area.

2. Transfer sheet material of claim 1 which includes a clear thin adhesion-promoting layer disposed between the specularly reflective layer and the transfer layer.

3. Transfer sheet material of claim 2 in which said adhesion-promoting layer comprises a polyurethane.

4. Transfer sheet material of claim 2 in which said adhesion-promoting layer comprises a silane.

5. Transfer sheet material of claim 1 in which said transfer layer comprises a vinyl plastisol ink.

6. Transfer sheet material of claim 1 in which said transfer layer is at least 25 micrometers thick.

7. Transfer sheet material of claim 1 in which the microspheres have an average diameter of less than about 150 micrometers.

8. Transfer sheet material of claim 1 in which the specularly reflective layer comprises a transparent dielectric mirror.

9. Transfer sheet material for forming retroreflective graphic images on a substrate, said sheet material comprising a support sheet that includes a dimensionally stable base sheet and a heat-softenable exterior layer, a dense continuous monolayer of transparent microspheres averaging less than about 150 micrometers in diameter and partially and removably embedded in the heat-softenable layer to a depth averaging between about one-quarter and one-half of their diameters, a transparent dielectric mirror coated over the surfaces of the microspheres that are exposed above the heat-softenable layer, a clear thin adhesion-promoting layer coated over the dielectric mirror, and a transfer layer of heat-softenable fabric-penetrating vinyl plastisol ink printed over the layer of microspheres in an imagewise pattern which leaves areas of the layer of microspheres unprinted, the thickness of the transfer layer being at least 40 micrometers and sufficient to embed within the transfer layer the surfaces of the microspheres that are exposed above the support sheet in the printed areas; whereupon when the transfer layer is adhered to a fabric and the support sheet stripped away, the microspheres are pulled from the support sheet to form an image that is retroreflective over its full area.

10. Transfer sheet material of claim 9 in which the heat-softenable exterior layer comprises a polyolefin.

11. Transfer sheet material of claim 9 in which said adhesion-promoting layer comprises a polyurethane.

12. Transfer sheet material of claim 9 in which said transfer layer comprises at least two sublayers.

* * * * *